Aug. 23, 1927.

J. A. HUGHES 1,640,277

COMBINATION DESK AND FILE

Filed June 11 1926    10 Sheets-Sheet 1

INVENTOR.

John A. Hughes,

BY

Geo. F. Kimmel    ATTORNEY.

Aug. 23, 1927.

J. A. HUGHES 1,640,277

COMBINATION DESK AND FILE

Filed June 11, 1926

INVENTOR.
BY John A. Hughes,
Geo. P. Kimmel
ATTORNEY.

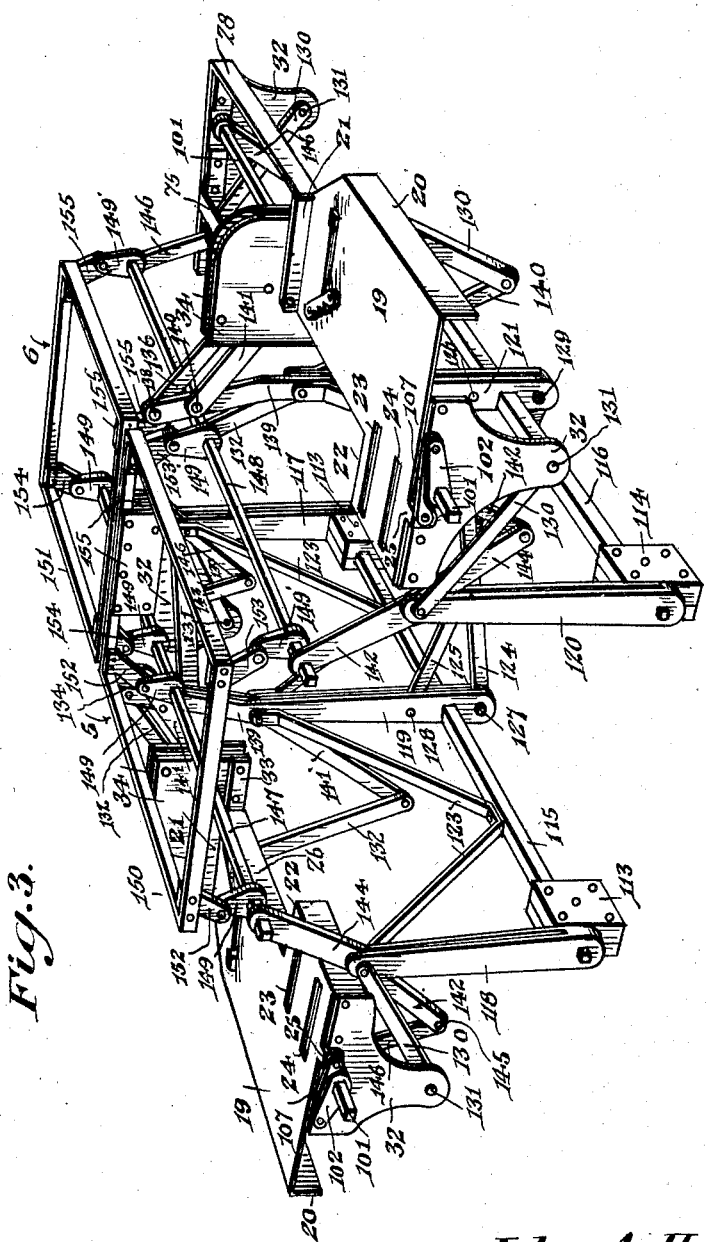

Aug. 23, 1927.
J. A. HUGHES
1,640,277
COMBINATION DESK AND FILE
Filed June 11 1926
10 Sheets-Sheet 4
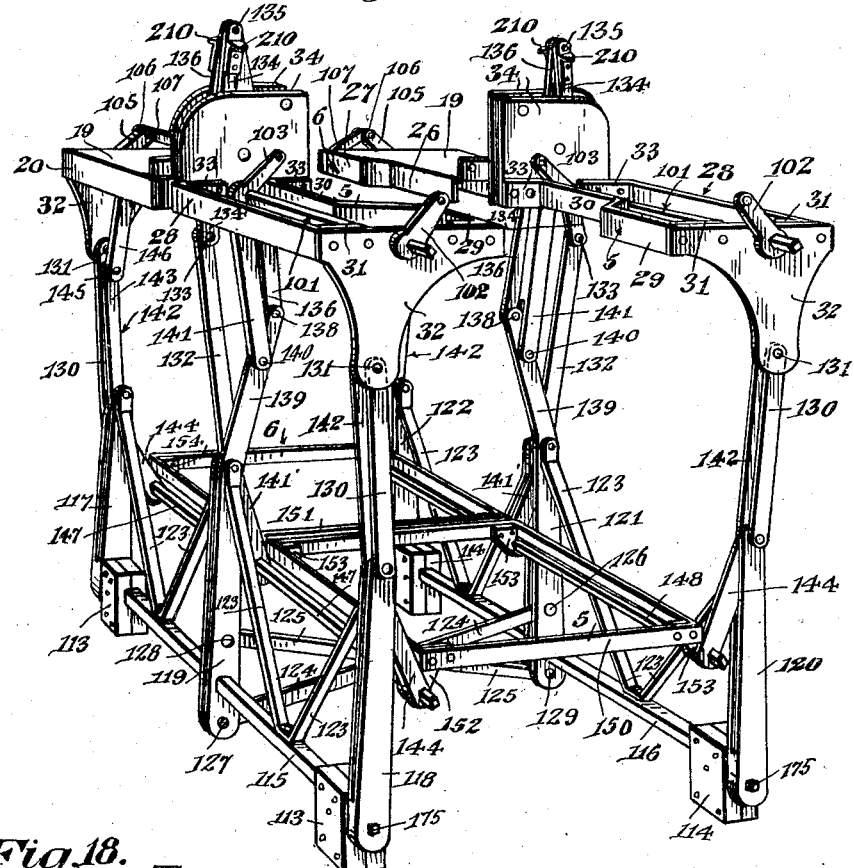

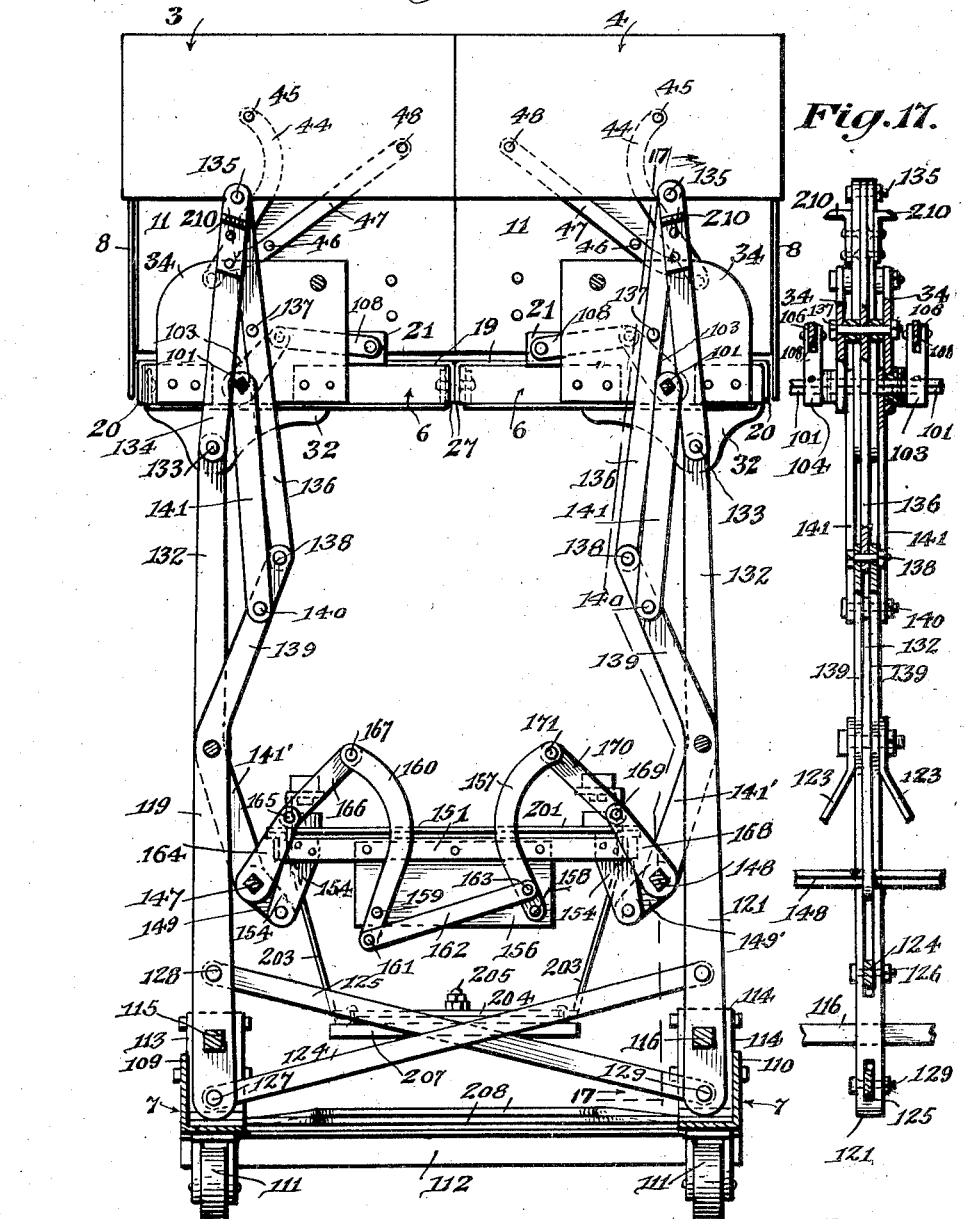

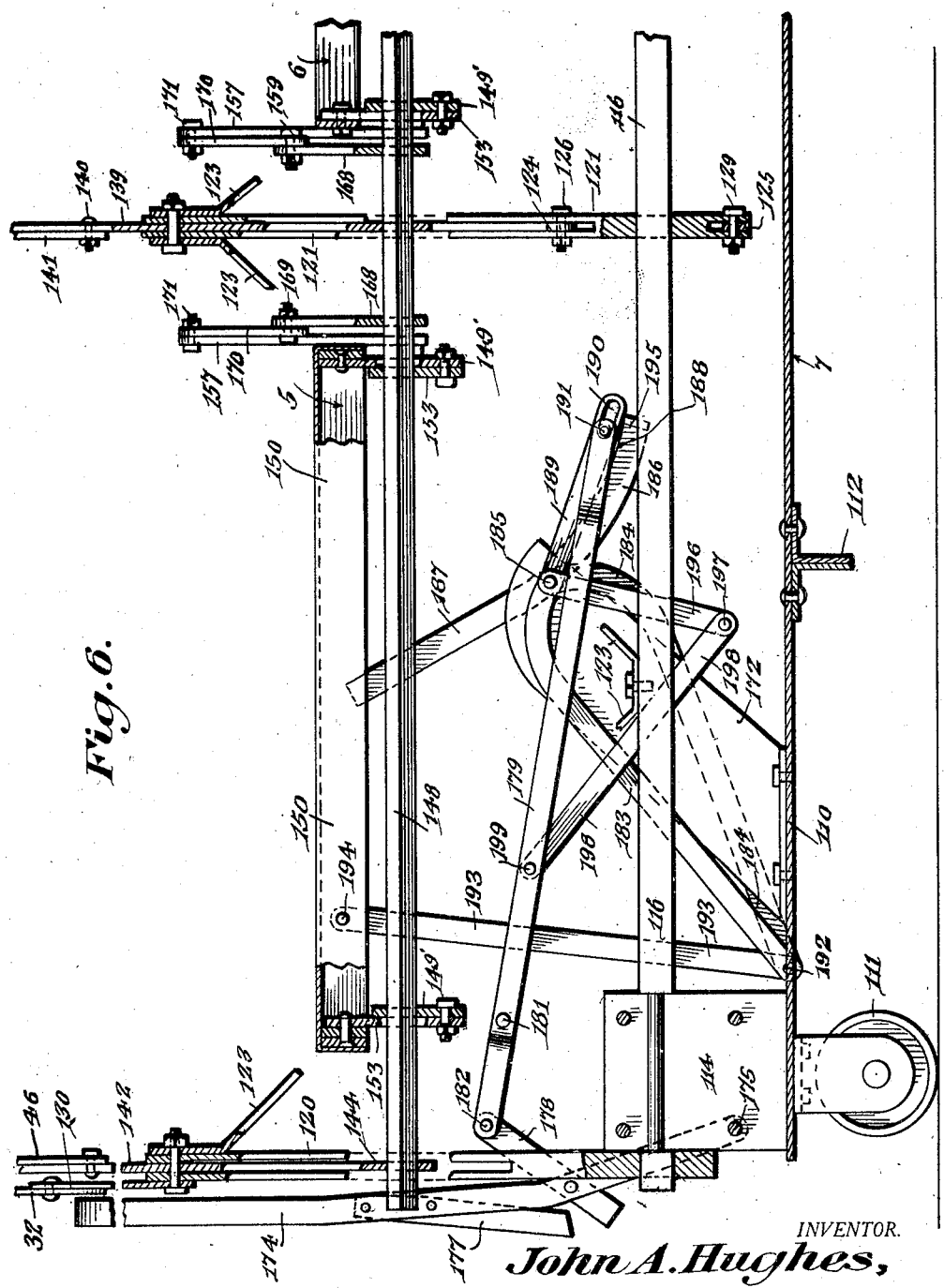

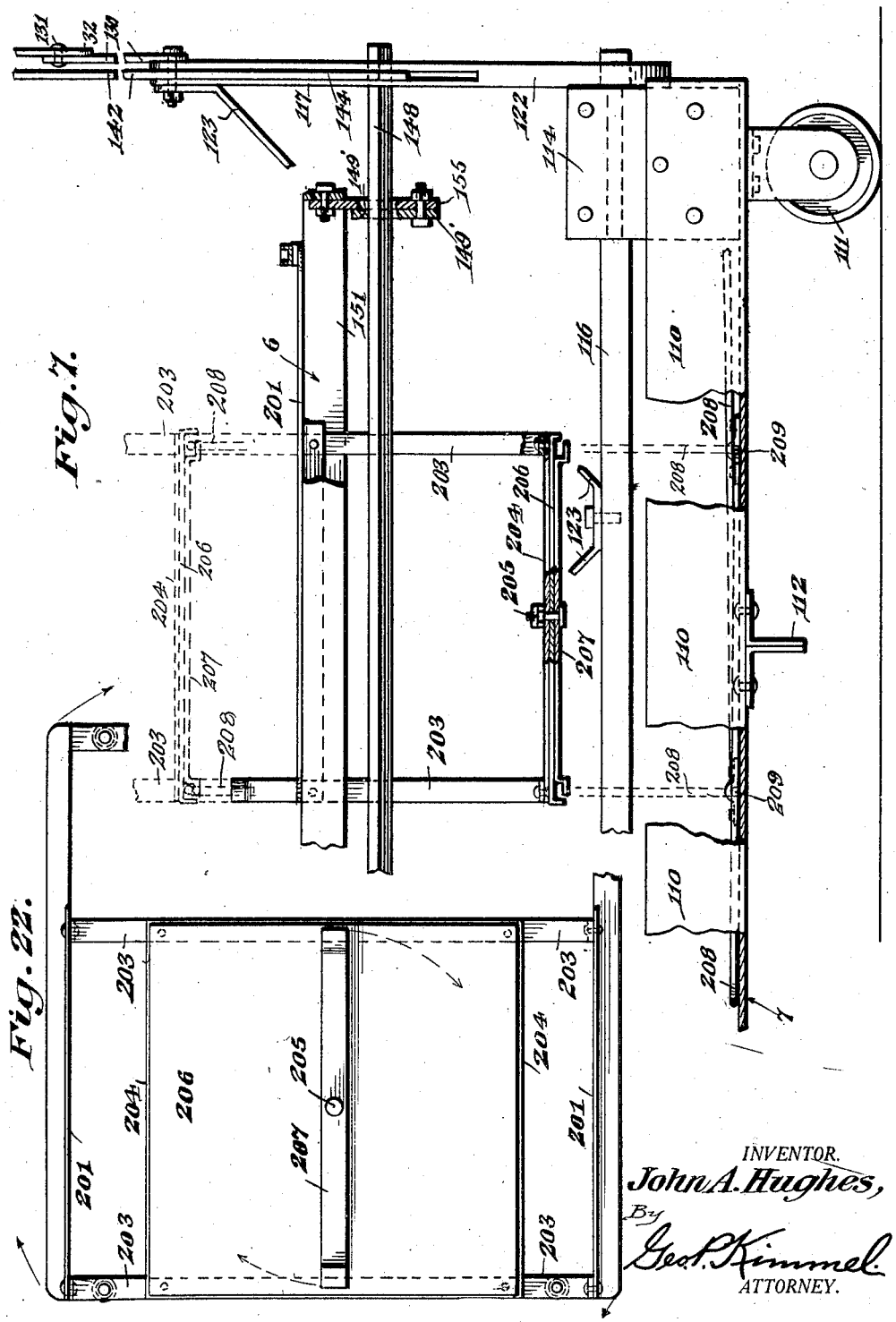

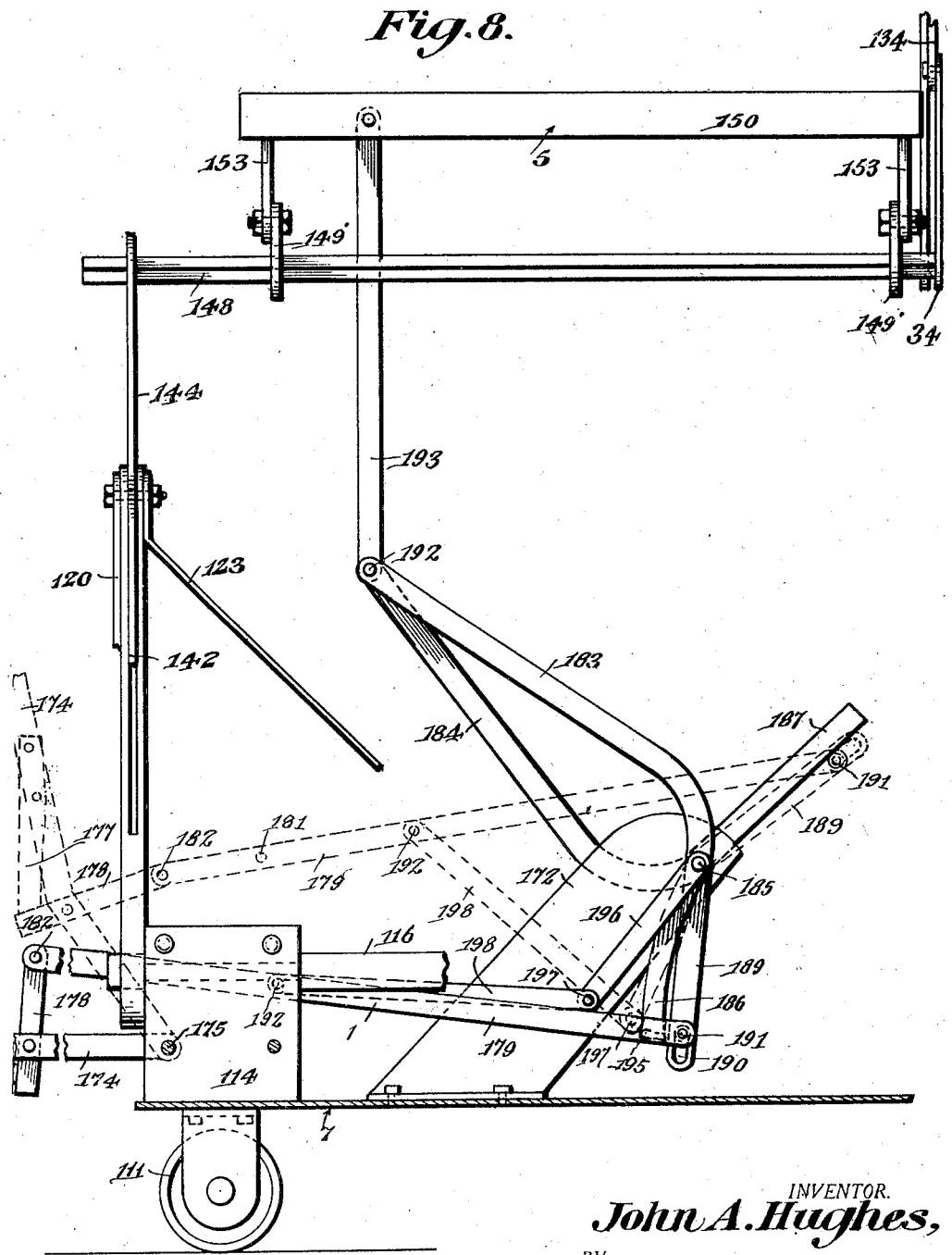

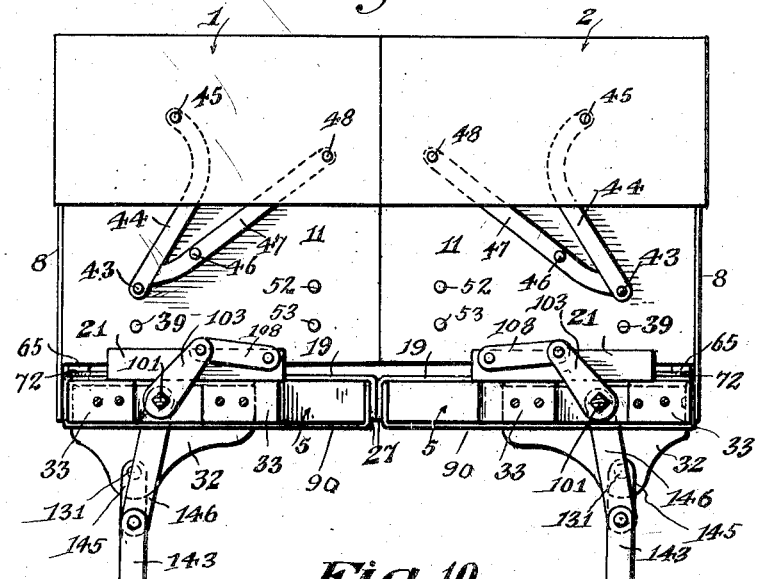

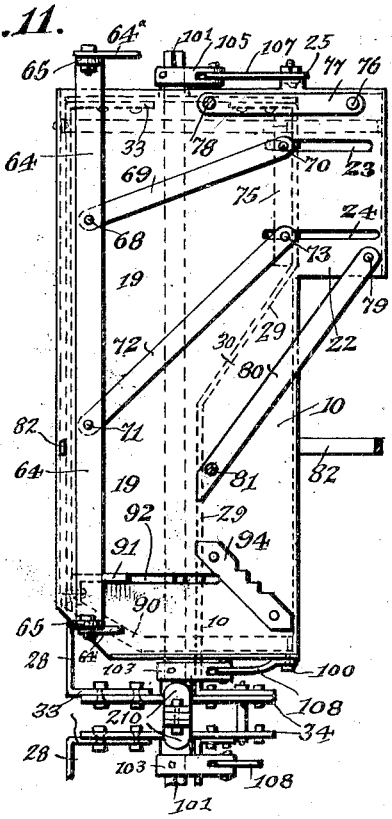

Patented Aug. 23, 1927.

1,640,277

UNITED STATES PATENT OFFICE.

JOHN A. HUGHES, OF WACO, TEXAS.

COMBINATION DESK AND FILE.

Application filed June 11, 1926. Serial No. 115,392.

This invention relates to a combination desk and file designed primarily as an article of office furniture, but it is to be understood that a combination desk and file, in accordance with this invention can be employed for any purposes for which it is found applicable, and the invention has for its object to provide, in a manner as hereinafter set forth, an article of furniture of the class referred to having means, when the article is thrown in open position, in convenient reach of a typist or accountant for the filing of typed records or work, or for convenient access to filed memoranda so that the same can be examined or removed and recorded thereon and replaced after the records have been made.

A further object of the invention is to provide, in a manner as hereinafter set forth, an article of furniture for office use, termed a combination desk and file and capable of being folded in a compact manner when not desired for use and stored in a comparatively small space.

A further object of the invention is to provide, in a manner as hereinafter set forth an article of furniture for office use, termed a combined desk and file and including a pair of synchronously shiftable supporting units for a pair of typewriters or calculating machines or for one of each, and two pair of synchronously shiftable filing units, each pair of filing units being common to a support and shiftable when the article of furniture is opened for use by typists or accountants to lateral open positions with respect to their associated support to be in convenient reach of the typist or accountant, and further whereby when the article of furniture is closed the filing units will be arranged in abutting closed positions and superposed with respect to the supporting units for the purpose to protect these latter.

A further object of the invention is to provide, in a manner as hereinafter set forth an article of furniture for office equipment, including two synchronously shiftable pair of filing units, and with the units of each pair shiftable in opposite directions to be arranged in open position laterally with respect to each side of a typewriter or calculating machine support so that convenient access can be had to a unit, and further whereby each of the units of each pair when open and laterally disposed with respect to a support can be swung on a vertical axis towards and away from the support, and further whereby the support, associated with each pair of units, will be elevated, on the shifting of a filing unit to open position, to arrange a typewriter or calculating machine carried thereby at the desired position for use by a typist or accountant.

A further object of the invention is to provide, in a manner as hereinafter set forth, an article of furniture for office equipment comprising two pair of normally closed synchronously shiftable filing units, a normally lowered typewriter or calculating machine support common to each pair of filing units, and means whereby said supports are synchronously elevated to position a typewriter or calculating machine for use when said units are synchronously shifted to open position and supported laterally with respect to the sides of said support when these latter are elevated, under such conditions providing for convenient access to each of the open filing units.

Further objects of the invention are to provide, in a manner as hereinafter set forth, an article of furniture for office equipment, termed a combination desk and file, which is comparatively simple in its construction and arrangement, conveniently shifted to open and closed position, portable, strong, fireproof, compact when shifted to closed position, thoroughly efficient in its use, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 3 is a perspective view of the article of furniture in an extended position for use and with certain of the elements thereof removed Figure 4 is a perspective view of the article of furniture when folded or closed and with certain of the elements thereof removed.

Figure 5 is a vertical transverse section of the device when in a closed position.

Figure 6 is a fragmentary view in longitudinal section, taken at one end of the machine.

Figure 7 is a fragmentary view, in longitudinal section taken at the other end of the device.

Figure 8 is a side elevation, partly in section, at one end of the device with the parts in extended position.

Figure 9 is a fragmentary view, in transverse section, illustrating a pair of filing cases or cabinets in closed position.

Figure 10 is a vertical sectional view of structure shown in Figure 9.

Figure 11 is a fragmentary view, in plan, illustrating a support for a filing cabinet.

Figure 12 is a horizontal sectional view through one of the filing cabinets.

Figure 13 is a horizontal sectional view through one of the filing cases or a cabinet and further illustrating the latter in position when swung towards a typewriter or calculating machine support.

Figure 14 is a fragmentary view in detail, illustrating the locking means for maintaining the filing cabinet in shifted position.

Figure 15 is a detail view of one of the elements of the device shown in Figure 14.

Figure 16 is a section on line 16—16, Figure 14.

Figure 17 is a vertical sectional view on line 17—17 Figure 5.

Figure 18 is a fragmentary view, in transverse section, illustrating a filing cabinet or case in open position and its lateral disposition with respect to a typewriter or calculating machine support.

Figure 22 is an inverted plan view illustrating certain elements of said elevating device shown in Figure 21.

Figure 23 is a perspective view illustrating a latch member for the cover of the filing case or cabinet.

Figures 1, 19, 20:
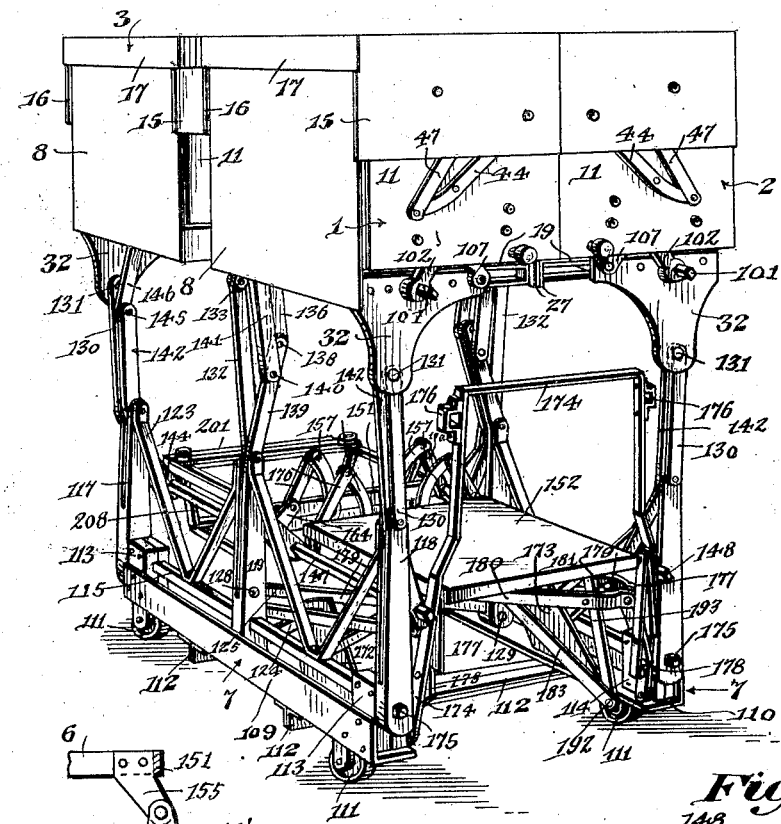
Figure 1 is a perspective view, of an article of furniture in accordance with this invention and with the same in closed position.
Figure 19 is a fragmentary view, partly in section, illustrating the shifting means for a filing case or cabinet.
Figure 20 is a section on line 20—20 Figure 19.

An article of furniture for office use, in accordance with this invention termed a combination desk and file, includes two pair of synchronously shiftable normally closed suspended filing units, the units of each pair, when shifted to an open and closed position moving in opposite directions with respect to each other, a pair of normally lowered, synchronously operated, vertically movable supports, each support being common to a pair of filing units and providing means for supporting or carrying a typewriter or a calculating machine to position the latter for use when the article of furniture is shifted to open position, a truck common to said units and supports, and means carried by the truck and connected to said units and vertically movable supports to provide for the synchronous shifting of the units and supports when the article of furniture is moved to open and closed positions. The said means providing for opening and closing the filing units and for positioning these latter when open at each side of the supports and for suspending the units over the supports when the combined desk and file is in closed position.

The filing units of one pair are indicated at 1 and 2 and the filing units of the other pair at 3 and 4. The supports two in number for carrying or supporting typewriters or calculating machines or one of each, are indicated generally at 5 and 6. When the article of furniture is in open position, the units 1 and 2 are supported in open position and spaced in sidewise relation with respect to the support 5 and the units 3 and 4 are arranged in a like manner with respect to the support 6, or in other words when an article of furniture is open the filing units are arranged in lateral disposition with respect to the sides of the support. The filing units are furthermore so set up that they can be swung towards the supports when desired. When the article of furniture is closed, the filing units 1 and 2 are closed and arranged in sidewise abutting position and further superposed with respect to the support 5, and the units 3 and 4 are arranged in a similar manner with respect to the support 6. When the article of furniture is closed, the supports are positioned in close proximity to a portable truck referred to generally by the reference character 7. The units 1 and 2 are oppositely disposed with respect to each other and the units 3 and 4 are arranged in a like manner. The supports 5 and 6 are disposed in lengthwise arrangement with respect to each other, but are suitably spaced at the opposed ends.

Each filing unit is termed a filing case or cabinet and as the said units are of the same construction, but one will be described, as the description of one will apply to the other.

Figure 2:
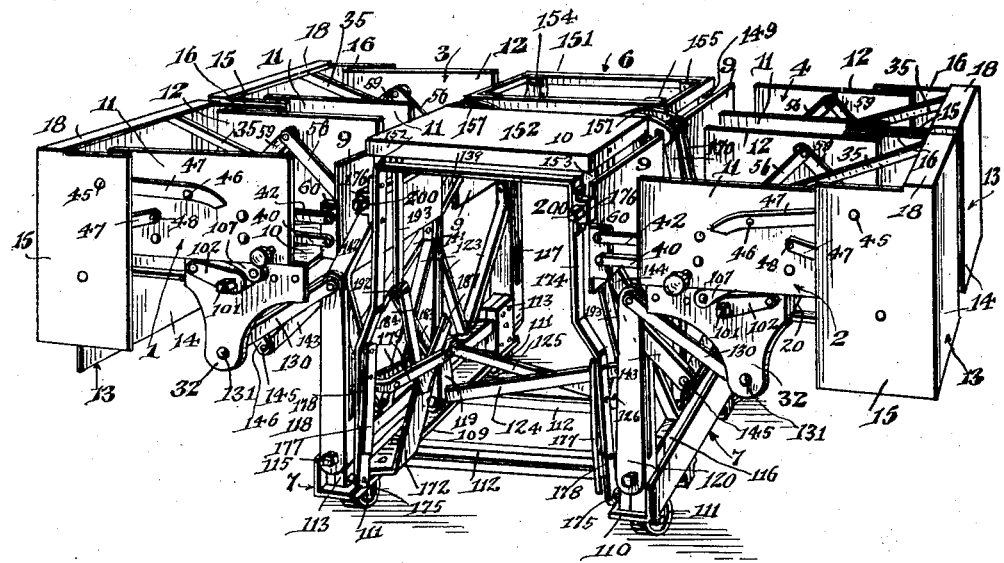
Figure 2 is a view similar to Figure 1 with the article of furniture in open position for use.

With reference to Figures 2, 9 and 10, each filing unit consists of a shiftable outer side wall 8, a shiftable inner side wall 9 of less height than the outer side wall 8, a bottom 10 and a pair of end walls 11, 12, which are formed integral with the bottom 10. Each filing unit further includes a shiftable closure or cover referred to generally by the reference character 13 and formed of a top wall 14, a pair of end walls 15, 16 and an outer and an inner side wall 17, 18 respectively. The side walls of the closure, lid or cover 13 are of less height than the end walls 15 and 16 thereof. When the filing unit is closed the walls 15 and 16 thereof overlap the walls 11 and 12 of the body portion, the side wall 17 of the closure is arranged outwardly with respect to the shiftable side wall 8 and the side wall 18 of the closure is arranged above the shiftable side wall 9 and in this connection see Figure 10. When the filing unit is open the top wall of the closure 13 is arranged in sidewise relation with respect to the bottom 10 of the unit, see Figure 2, and is further spaced therefrom, the side wall 8 is spaced from the bottom 10 of the body portion of the unit, the side wall 9 is spaced from the body portion of the unit, that is to say the bottom 10 and end walls 11 and 12 and the end walls 15 and 16 of the closure 13 oppose the end walls 11 and 12, are spaced therefrom, and further project laterally with respect thereto, and in this connection see Figure 2. When a pair of units are closed, that is to say the units 1 and 2 or the units 3 and 4, they will be in the position as shown in Figures 9 and 10 of the drawings, and when open will assume the position as shown in Figure 2 of the drawings. When a unit is closed the cover 13 thereof is arranged in overlapping position with respect to the body portion of a unit, as shown in Figures 9 and 10. The cover 13 for each unit is normally latched to provide for the same to assume the position shown in Figure 9 when the unit is closed and the position shown in Figure 2 when the unit is open. The closure or cover 13 is so set up, that after the unit has been opened it can be swung upon the top of the body portion of the unit to provide a rest or a table and this feature will be hereinafter referred to.

Each filing unit has associated with the body portion thereof a support therefor and as each of said supports is of the same construction, but one will be described as the description of one will apply to the other, and with reference to Figure 3 each support consists of a plate 19, provided at its outer side with a depending flange 20, at its inner end with an upstanding transversely extending flange 21 and further formed with an inwardly extending rectangular extension 22 at its outer portion. The extension 22 is provided with a pair of rectangular slots 23, 24. The extension 22 at its outer side is provided with a lateral lug 25. With reference to Figure 18 it will be seen that the plate 19 is provided at its inner side with a depending flange 26 and that the extension 22 is formed with a depending flange 27 at the inner side thereof. Each support is mounted to slide upon a carrier therefor and as each carrier is of the same construction, but one will be described, as the description of one will apply to the other. Each of said carriers, with reference to Figure 4 consists of a frame formed of a pair of lengthwise opposed spaced bars 28, 29 and with the latter having its inner portion inset as at 30 and the said bar 29 conforms in contour substantially to the inner side of the support. At the outer end of the bars 28, 29 they are inturned, as at 31 and fixedly secured to a depending triangular shaped plate 32. The inner ends of the bars 28 and 29 are inturned as at 33 and are secured to a vertically extending plate 34, which acts as a spacing means and a support for a purpose to be presently referred to.

Associated with each of the filing units is an opening and closing mechanism therefor and as the said mechanisms are of like construction, but one will be described as the description of one applies to the other. The opening and closing mechanism employed with the units 1 and 2 are oppositely disposed with respect to each other and the opening and closing mechanism for the units 3 and 4 are oppositely disposed with respect to each other. The opening and closing mechanism of each unit is arranged at each end thereof and the elements of the opening and closing mechanism at one end of a unit is the same as the elements at the other end of the unit. Each mechanism at each end of a unit, with reference to Figure 10, consists of an elongated link formed of two portions 35 and 36 which are angularly disposed with respect to each other and with the portion 35 termed the upper portion and of greater length than the portion 36. The upper end of the portion 35 is formed with an angularly disposed part 37, which normally engages a latching member 38 carried by the inner side wall 18 of the closure 13. Secured to an end wall of the body portion of the unit is a fixed pivot 39 having mounted thereon the lower end of a swinging link 40 and the upper end of the latter is pivotally connected to a flange 41 carried by the outer side wall 8 of the unit. Pivotally connected at its upper end to the flange 41, is a depending link 42, which is pivotally connected at its other end to a pivot pin 43 which extends through an end wall of the body portion of the unit and has mounted thereon exteriorly of said wall the lower end of an upstanding link 44 having a curved upper portion which is pivotally connected as at 45 to the inner face of an end wall of the closure 13. Carried by an end wall of the body portion of the unit, is a pivot 46, upon which is mounted a lever arm 47, the latter being pivoted at its upper end as at 48 to an end wall of the closure 13 and having its lower end forming stop which engages the link 44 to arrest the closing movement of closure 13. Mounted on the pivot 39 is a link 49 which is pivotally connected as at 50 at the point of joinder of the parts 35 and 36 of the upstanding link 51. Carried by each end wall of the body portion of the unit, is a pair of spaced pivots 52, 53 and mounted on the former is a lever arm 54, which is pivotally connected at its lower end, as at 55, to the lower end of a link 56, which has its upper end pivotally connected as at 57 to the inner end of a lever arm 58 mounted on the pivot 46. Pivotally connected to the upper end of the lever arm 58, is a link 59 which is pivotally connected to the link 42. Pivotally mounted on the pivot 53 and also pivotally connected to a flange 60 carried by the shiftable inner side wall 9 of the filing unit is a link 61. The upper end of the lever arm 54 is pivotally connected at 62 to the flange 60. The links 40 and 42 provide means for swinging the side wall 8 of the filing unit to the position shown in Figure 2 and the lever 54 provides means for shifting the inner side wall 9 of the filing unit to the position shown in Figure 2. The lower end of the part 36 of the link 51 is pivotally connected as at 63 to the lower end of the lever 58 and extending from the pivot 63 is an actuating link 64'. The upstanding link 51 at one end of the filing unit and the upstanding link 51 at the upper end of the filing unit when engaged with the latches 38 prevent the shifting of the lid or closure from the position thereof as shown in Figure 2 or as shown in Figure 9, as long as said links are engaged by the latches 38, but when disconnected from the latches 38, the closure 13 can be swung from the position as shown in Figure 2 upon the body portion of the unit so as to provide a platform, rest, support or table. The link 44 and lever 47 provide means for shifting the lid to the position shown in Figure 2 and also to closure position with respect to the body portion of the unit and such position is as illustrated in Figure 9.

The elements of the opening and closing mechanism, for a unit, arranged at one end of the unit are connected to the elements of said mechanism arranged at the other end of the unit, by the actuating links 64' in connection with a coupling bar 64. See Figures 11, 12 and 13. The coupling bar 64 is positioned upon the outer side marginal portion of the plate 19 and is provided at each end with an upturned flange 65 to which is pivotally connected an actuating link 64'. The flanges 65 extend up through transverse slots 66 formed in the bottom 10 of the body portion of a unit, see Figure 13. The bottom 10 of said unit is furthermore provided at one end with a transversely extending slot 67 which is arranged inwardly with respect to and out of alinement with the slot 66 arranged at the outer end of the bottom 10 and in this connection see Figure 12. The purpose of the slot 67 will be hereinafter referred to. The coupling bar 64 is slidably mounted upon the plate 19. By slidably mounting the coupling bar 64, the filing unit can be shifted in a direction towards the support for a typewriter or calculating machine and the position of the filing unit would be as shown in Figure 13.

See Figures 11, 12 and 13. The coupling bar 64 has pivotally connected therewith as at 68 a link 69 which is slidably connected as at 70, to the extension 22 at the slot 23. Pivotally connected to the connecting or coupling bar 64, as at 71, is an inclined link 72, which is slidably connected as at 73 to the extension 22 at the slot 24. The pivots 70 and 73 which constitute the connections for the links 69 and 72 with the extension 22, are shiftably connected to a flange 75 carried by the bar 29. Pivotally connected to the extension 22, as at 76, is a coupling link 77, which is also pivoted as at 78 to the bottom 10 of the body portion of a unit. Pivotally connected to the extension 22, as at 79, is an inclined coupling link 80, which is pivotally connected as at 81 to the bottom 10 of the body portion of a unit. By this arrangement the horizontal angular unit can be swung to the position shown in Figure 13, when said unit is released. With reference to Figure 18 a yoke 82 is illustrated and which is connected as at 83 to the body portion of the filing unit and extends down through the bottom 10. Slots 84 are provided in the bottom 10 for the passage of the arms of the yoke. The yoke surrounds the plate 19 and bars 28 and 29. See Figure 18. Swivelly connected to the yoke 82 and depending therefrom, is a coupling member 85 in which is slidably mounted a locking member 86 provided with an angularly disposed end portion 87 formed with a nose 88. The locking member 86 is pivotally connected as at 89 to a yoke 90, see Figures 13 and 14. The yoke 90 is secured to and depends from the inner end of the plate 19. The manner in which the member 86 locks the unit in the position shown in Figure 13, will be presently referred to.

The coupling bar 64, with reference to Figures 11 and 13 has associated therewith a stop member 91 which is secured to the lower face of the plate 19 and extends up through a slot 92 formed in the inner portion of the plate 19. The stop member 91 projects above the plate 19 and is positioned in the path of the coupling bar 64. The stop 91 prevents the inner end of the filing unit from swinging inwardly off the plate 19 in a direction toward the support for the typewriter or calculating machine. The stop 91 does not interfere with the swinging of the filing unit to the position shown in Figure 13. The filing unit is normally locked in the position shown in Figure 12, by a pivoted latch 93, which engages with a toothed bar 94 secured to the upper face of the plate 19 near the inner end thereof. The latch 93 is pivotally connected as at 95 to the lower face of the bottom 10 of the body portion of the filing unit. Associated with the latch 93 is a spring controlled shifting element therefor and which consists of a rod 96 pivotally connected as at 97 to the latch 93 and extending through the outer end wall of the filing unit. The controlling spring for the rod 96 is indicated at 98 and is interposed between an end wall of a filing unit and a collar 99 fixed to the rod 96. When the latching member 93 is shifted from engagement with the bar 94, it is held against the action of the controlling spring 98. When said latching member 93 is shifted from engagement with the toothed bar 94, the filing unit can be swung to the position as shown in Figure 13. When the filing unit is shifted to the position shown in Figure 13 the nose of the locking member 86 will engage an element to be hereinafter referred to, so as to prevent the closing of the article of furniture, until the filing unit is shifted to the position shown in Figure 12.

The plate 19, opposite that end provided with the lug 26, is formed with a lug 100.

Common to the filing units 1 and 3 and common to the filing units 2 and 4 is an actuating shaft for the opening and closing mechanisms for each pair of said units. The said actuating shafts are referred to generally by the reference numeral 101 and which extend and pass through the plates 32, arranged at the front and rear of the combined desk and file. Each shaft 101 extends through a pair of opposed spacing plates 34 see Figure 17. The shafts 101 are operated in a manner as hereinafter referred to. Each shaft 101 is provided with four crank arms as indicated at 102, 103, 104, 105 see Figures 4 and 17. Each of said crank arms is bifurcated as indicated at 106. Pivotally connected to the lug 25 formed on the support for the filing unit 3 and with the lug 25 formed in the support for the filing unit 4 is a lever arm 107. One of said lever arms 107 is pivotally connected to the crank arm 102 and the other of said lever arms is pivotally connected to the crank arm 105. The slot 67 provides a passage for the crank arm 105 and its attached lever arm 107, when the crank arm 105, is swung upwardly, see dotted line showing, Figure 10. Pivotally connected to the lug 100 formed at the inner end of a support for each filing unit is a lever arm 108. The lever arm 108 carried by the support for the filing unit 1 or 3 is pivotally connected to the crank arm 103 and the lever arm 108 carried by the support for the filing unit 2 or 4 is pivotally connected to the crank arm 104. When the carriers for the supports move downwardly the lever arms in connection with the crank arms carried by the shafts 101 provide for the outward shifting of the supports carrying the filing units therewith and when the carriers move upwardly a reversed movement is had with respect to the supports and filing units, that is to say they are shifted inwardly.

The truck consists of a pair of oppositely disposed angle irons 109 and 110 and each of which is provided with a pair of wheels or rollers 111. The angle irons 109 and 110 are connected together by transversely extending T-irons 112 for maintaining them in spaced relation. Arranged at the forward and rear ends of the angle iron 109 are boxings 113 and arranged at the ends of the angle irons 110 are boxings 114, see Figures 1 and 4. Journaled in the boxings 113 is a longitudinally extending shaft 115 having the portions thereof extended from said boxings 113 of polygonal contour and the portions thereof within the boxing 113 of cylindrical contour see Figure 6. Journaled in the boxings 114 is a longitudinally extending shaft 116 having the portions thereof extending from said boxings of polygonal contour and the portions mounted in the boxings of cylindrical contour. The shaft 115 projects a substantial distance outwardly with respect to the boxings 113 and the shaft 116 projects a substantial distance outwardly with respect to the boxings 114. Connected to one end of the shaft 115 and bodily shiftable therewith is a bifurcated link 117. Connected to the outer end of the shaft 115 and bodily shiftable therewith is a bifurcated link 118. Connected to the shaft 115 intermediate the ends thereof, as well as bodily revolving therewith, is a bifurcated link 119. The shaft 116 is provided with bifurcated links 120, 121 and 122. Links 117, 118 and 119 oppose respectively the links 120, 121, 122. A bracing element is interposed between the links 117 and 119, between the links 119 and 118, between the links 120 and 121 and between the links 121 and 122. The bracing elements are of V-shaped contour and are fixedly secured to the shafts 115 and 116 and also to the bifurcated links. The bracing elements are indicated at 123. The bracing elements move with the shafts 115 and 116 when these latter are shifted. The shafts 115 and 116 are synchronously operated and the connection to provide for such operation consists of a pair of oppositely disposed inclined connecting bars 124 and 125. The bar 124 is pivotally connected at its upper end, as at 126 to the link 121 and at its lower end as at 127 to the link 119.

The bar 125 is pivotally connected as at 128 to the link 119. The connection between the bar 125 and the link 119 being at the upper end of the bar 125, and the lower end of the latter is pivotally connected as at 129 to the lower end of the link 121. By this arrangement when either one of the shafts are actuated both shafts will move in unison. The movement of the shafts when moving in unison is in opposite directions with respect to each other. When the shafts 115 and 116 are shifted to open the combined desk and file the shafts move in an outward direction and when shifted to close the combined desk and file move in an inward direction.

Pivotally connected to the links 117, 118, 120 and 122 is an upstanding link 130. Each link 130 is pivotally connected at its upper end as at 131 to a depending triangular plate 32. The links 130 are pivoted against the rear face of the plates 32. See Figure 4. Pivotally connected to the link 119 as well as the link 121, is an upstanding link 132, which is pivotally connected as at 133 between a pair of upstanding links 134 and these latter have their upper ends pivotally connected as at 135, to a depending lever arm 136, which is mounted on a pivot 137 carried by a pair of opposed spacer plates 34. The lower end of the lever arm 136 is pivotally connected as at 138 to an angular extension 139 formed on one of the arms of the bifurcated link 119 or 121. The angular extension 139 is pivotally connected as at 140 to a pair of upstanding links 141, which are fixed to a shaft 101. The upper end of the links 141, are fixed to a shaft 101 between the pair of spacer plates 34, see Figure 17.

The link 139, which may be termed an actuating or rock arm, has an angularly disposed portion 141' which extends inwardly with respect to a link 119 or link 121. See Figure 5. Pivotally connected to a link 117 or a link 118, or link 120 or link 122, is an actuating or rocker arm 142, formed of a pair of angularly disposed portions 143 and 144. The arms 142 carried by the links 117 and 122 are oppositely disposed with respect to each other and the arms 142 carried by the links 118 and 120 are oppositely disposed with respect to each other. The upper end portion 143 of each arm 142, is pivotally connected as at 145, see Figures 1 and 4, to one end of a link 146, which has its upper end swung on a shaft 101. The arms 132 perform the same function as the arms 142 with respect to elevating the support for the typewriters or calculating machine. The arms 132 and 142, carried by the links 117, 118 and 119 are connected together by a squared shaft 147 and which is bodily carried by said arms. The arms 132 and 142 carried by the links 121, 120 and 122 are connected together by a squared shaft 148 which bodily moves with said arms. With reference to Figure 3, the shaft 147 is provided with four crank arms arranged in spaced relation and indicated at 149. The shaft 148 is provided with four crank arms which are indicated at 149' and are arranged in spaced relation. The crank arms 149 are arranged in alinement or rather oppose the crank arms 149'. One of the supports for a calculating machine or typewriter is indicated at 150 and the other at 151 and each of which consists of a rectangular frame and if desired the frame can be provided with a platform 152 suitably connected therewith. The support 150 at one side thereof is provided with a pair of oppositely extended inclined depending ears 152 which are pivotally connected to a pair of crank arms 149 and at the other side thereof with a pair of outwardly extended inclined ears 153 which are pivotally connected to a pair of crank arms 149'. The support 151 at one side thereof is provided with a pair of depending outwardly inclined ears 154 which are pivotally connected to a pair of crank arms 149 and the support 151 at the other side thereof is provided with a pair of depending outwardly inclined ears 155 which are pivotally connected to the other pair of crank arms 149'. The arrangement of the crank arms and ears in the manner as aforesaid is clearly shown in Figure 3. The ears, in connection with the crank arms, as well as the squared shafts 147 and 148, and in connection with the rocker arms provide for the elevating and lowering of the supports. When the supports are in an elevated position, the rocker arms assume the position shown in Figures 3 and 18 and when in a lowered position the parts are as illustrated in Figure 4.

At the inner end of each of said supports a mechanism or device is arranged to prevent the wabbling of the support or sidewise tilting thereof when moved upwardly or downwardly and said mechanism used in connection with one support, is the same in construction as that applied or used in connection with the other support. Each of said mechanisms consists of a plate 156 which depends from the inner end of a support and has pivotally connected therewith the lower end of a curved link 157. The link 157 is outwardly curved and pivoted at its lower end as at 158 to the plate 156. Pivoted intermediate its ends to the plate 156, as at 159 is an outwardly curved lever arm 160, which has attached to its lower end as at 161 a pivoted link 162, and the latter is pivotally connected as at 163 to the link 157 above its pivot 158. See Figure 5. Carried by the squared shaft 147 is a crank arm 164, which is pivoted at its upper end as at 165, to the lower end of a link 166 which has its upper end pivoted as at 167 to the lever 160, see Figure 5. Carried by the squared shaft 148 is a crank arm 168 which is pivotally connected at its upper end as at 169 to the lower end of a link 170, which has its upper end pivoted as at 171 to the upper end of a link 157. On the elevating and lowering of the support, the stabilizing mechanism therefor operates in opposite directions thereby providing what may be termed a uniform pull to prevent any possibility of the support tilting or wabbling on its vertical movement. The stabilizing mechanism is also shown in Figure 6.

The combined desk and file further includes a means for operating the same to assist in shifting the combined desk to open position and to assist in the closing of the combined desk and file. This mechanism is best shown in Figures 6 and 8 and in Figure 6 the mechanism is shown in position when the combined desk and file is closed and Figure 8 illustrates the arrangement of the parts of such mechanism when the combined desk and file is open. With reference to Figure 1, the angle iron 109 of the truck 7, as well as the angle iron 110 of the truck 7, is provided with an upstanding bracket. These brackets are disposed at an angle and are indicated at 172, 173. The construction and arrangement of the brackets aforesaid are more clearly shown in Figures 6 and 8. The brackets 172 and 173 are arranged inwardly with respect to the shafts 115 and 116. Pivotally connected to the boxings 113 and 114 at one end of the machine, see Figures 1 and 6 is an inverted yoke-shaped lever 174. The pivots for the lower ends of the arms of the lever 174 are indicated at 175. See Figure 1. The upper portion of the arms of the lever 174 are inset and each inset portion is provided on its outer side with a keeper 176. Each arm of the lever 174 is provided with a stop member 177 and the function of which will be presently referred to. Pivoted to each arm of the lever 174 below the stop member 177 is a link 178, see Figure 6. Asosciated wth each link 178 is a pair of pulling members 179 and 180, best shown in Figure 1. The members are maintained in spaced relation by a spacer 181 near the forward ends thereof. The forward ends of the pulling members 179 and 180 are pivotally connected as at 182 to the link 178, see Figures 1 and 6. The members 179 and 180 at their inner ends straddle the bracket 172 or 173, see Figure 6. With reference to Figure 6, the said mechanism further includes a pair of oppositely disposed curved lever arms 183 and 184 and the curved ends of said arms are extended towards each other. The curved ends of the lever arms 183 and 184 are pivotally connected as at 185 to a bracket 172 or 173. The lever arms are arranged on each side of their associated bracket. The lever arm 183 has a portion 186 which extends from the brackets 172 and 173 at a downward inclination and the lever arm 184 has an extension 187 which projects from the brackets 172, 173 at an upward and a forward inclination. The extension 186 of the lever arm 183 has a curved top edge as indicated at 188, see Figure 6. Mounted on the pivot 185 is a downwardly inclined link 189 and which can swing on the pivot 185. The free end of the link 189 is provided with a slot 190. The pulling members 179 and 180 are connected together at their inner ends, as at 191 and the connection carries a roller which travels in the slot 190. See Figure 6. The outer ends, or rather lower ends of the levers 183 and 184, are pivotally connected as at 192, to the lower ends of an upstanding bar 193, which is pivotally connected as at 194 to a support, and as shown support 150. The extension 186 of the lever arm 183 is provided with a nose 195. Pivotally connected to the pivot 185 is a depending link 196, pivotally connected at its lower end, as at 197, to a link 198, which is pivotally connected as at 199, to the pulling member 179. See Figure 6. The extension 186 provides means for elevating the arm 193, and the extension 187 means for lowering the arm 193, and the action of the extensions will be more fully referred to.

It will be assumed that the parts are in the position as shown in Figure 6, that is to say the parts of the elevating and lowering mechanism or rather actuating mechanism to provide for the initial start or for the shift of the combined desk and file to open or closed position. By moving the lever 174 downwardly, the stop members 177 will engage the links 178 and which in turn will pull the members 179 and 180 outward, and as the members 179 and 180 move outwardly, the connection between the ends of said pulling members 179 and 180 indicated at 191 will ride against the extension 186 of the lever arm 183 and depress the same thereby providing for an upward movement of the rod or bar 193 and elevate the support 150, and as the connections between the supports 150 and 151 and the filing cabinets will be actuated, it is obvious that the cabinets will be shifted to open position. When the combined desk and file has been shifted to open position the keepers 176 will engage the extensions 200 see Figure 2. When the lever 174 is shifted to have its keepers engage the extensions 200, the parts of the mechanism will be as shown in dotted lines in Figure 8, with the connection 191 positioned against the inner edge of the extension 187, but the lever arms 183 and 184 as well as the rod or bar 193 will be in full line position as shown in Figure 8. The nose 195 provides means to have certain of the parts assume the dotted line position shown in Figure 8 when the lever 174 is elevated to have its keepers engage with the extensions 200. It will be assumed that the parts are as shown in Figure 8, that is to say the combined desk and file being in open position, and it is desired to close the same, the lever 174 is lowered whereby the pull members are moved outwardly as the pull members move outwardly the connection 191 engaging the extension 187 of the lever 184 will swing the same to the position as shown in Figure 6, and on the swinging of such extension to said position, the lever arm 183 will be caused to assume the position shown in Figure 6, due to the lowering of the bar 193, caused by the action of the connection 191, on the extension of the lever 184. When the combined desk and file has been closed by the mechanism shown in Figures 6 and 8, the elements of said mechanism, that is any one of them which is in elevated position will move to the full line position shown in Figure 6 by gravity.

Figure 21:
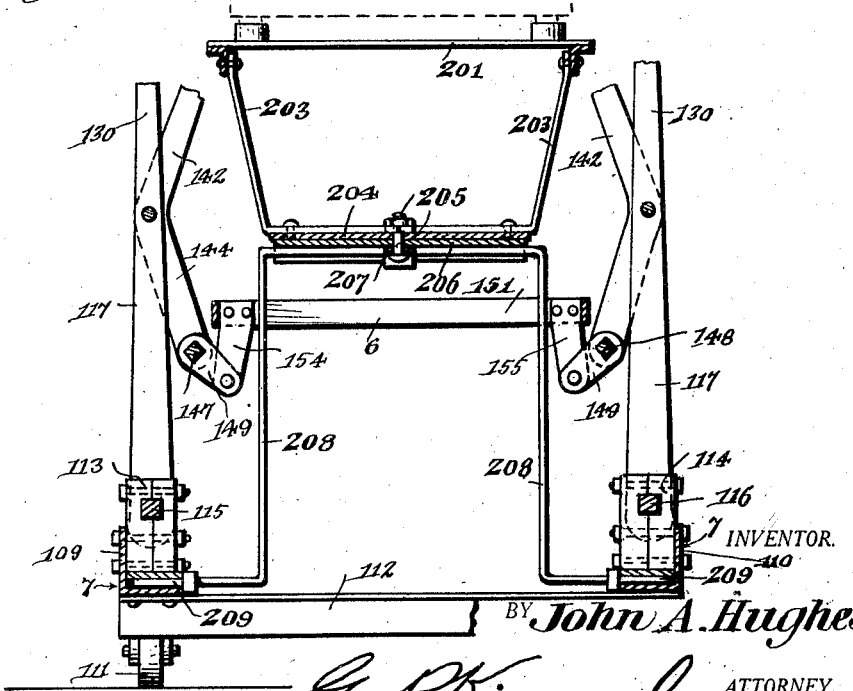
Figure 21 is a transverse sectional view illustrating an elevating device for shifting a calculating machine from its position when set for use.

The support 150 or 151, may be provided with a platform 201, carrying a typewriter or calculating machine 202, see Figure 21, and said platform has a depending bail 203, which carries a plate 204 which is swivelly connected as at 205 to a plate 206. The plate 206 carries a coupling member 207 for detachably connecting with said plate 206 a pair of supporting devices each of which consists of an inverted yoke 208 pivotally connected at its lower end as at 209. The yoke 208 extends up through a support 150 or 151. Both yokes are adapted to be detachably connected to the plate 206 by the coupling member 207 so as to maintain the platform 201 in the position shown in Figure 21, when a support 150 or 151 has been lowered. This attachment or supporting means or platform 201 is provided to maintain the calculating machine or typewriter at the desired height so that it can be repaired or a ribbon connected therewith. This also provides a means whereby it does not necessitate the typewriter or calculating machine to be removed from the combined desk and file.

Although the lever 174 can be employed to open or close the combined desk and file yet by pulling one of the filing units away from the other, the desk can be moved to open position and by shifting one of the filing units towards the other the desk and file will be moved to closed position. When the lever 174 is moved downwardly from the position shown in Figure 1, or one of the filing units moved away from the other, the supports will be shifted upwardly, which will provide for the shifting of the connections between the supports and the filing units to provide for the units and supports to assume the position shown in Figure 2. When the lever 174 has it keepers engage the extensions 200 the combined desk is locked in open position. When a filing unit is shifted to the position shown in Figure 13, the locking member 86 engages with an ear 210 carried by one of the links 134, see Figures 5, 17 and 13. When the filing unit is locked in the position as shown in Figure 13, the combined desk and file cannot be closed, until said filing unit is shifted to the position shown in Figure 12 or in other words released from an ear 210. When a filing unit is shifted to open position, as shown in Figure 2, the inner side wall, as well as the outer side wall of each unit is shifted away from the body portion thereof as shown in Figure 2 and further the outer side wall will depend below the closure 13. When the combined desk and file is shifted to closed position, the connections between the side walls of the unit and the end walls thereof will provide for the closing of said walls to permit the closure 13 to overlap the same in the manner as shown by Figure 5 of the drawing. The shifting of the side walls of each unit away from each other permits of papers or other memoranda to be extended laterally to provide spacing partitions or to permit of such paper to be readily found when desired by the typist or calculator.

The elements of the combined desk and file are so set up relatively to each other that when the typewriter or calculating machine is mounted on a support, the said typewriter or calculating machine can be of any desired height. When the combined desk and file is swung to open position, the weight of the filing unit tends to maintain the same in such position. The elements of the combined desk and file are so connected, that the filing units and supports will be synchronously shifted during the opening and closing movements of the desk and file and when the latter is in closed position, the filing units acts as a protecting medium for the typewriters or calculating machines mounted on the supports. As the combined desk and file is compact when in closed position and mounted on a portable supporting means it can be stored at any desired point and within a small space.

It is thought that the many advantages of an article of furniture for office use, such as a combination desk and file in accordance with this invention can be readily understood, and although the preferred embodiment of the invention is as illustrated and described, yet it is to be understood that changes in the details of construction can be had which will fall within the scope of the invention as claimed.

What I claim is:

1. A combined desk and file comprising a pair of oppositely movable, synchronously shiftable, normally closed filing units, a normally lowered vertically movable support for a typewriter or computing machine, a slidable support for each of said units, a carrier for each slidable support, and link and lever mechanisms connected with said units, supports and carriers and adapted when operated in one direction, to provide for the simultaneously shifting of said units to open position and said vertically movable support to its uppermost position and when operating in the opposite direction to lower said vertically movable support and to shift said units to closed position and in sidewise abutting relation and further superposed with respect to the lowered support.

2. A combined desk and file comprising a pair of oppositely movable, synchronously shiftable, normally closed filing units, a normally lowered vertically movable support for a typewriter or computing machine, a slidable support for each of said units, a carrier for each slidable support, link and lever mechanisms connected with said units, supports and carriers and adapted when operated in one direction, to provide for the simultaneously shifting of said units to open position and said vertically movable support to its uppermost position and when operating in the opposite direction to lower said vertically movable support and to shift said units to closed position and in sidewise abutting relation and further superposed with respect to the lowered support, and means whereby each of said units, when in open position, can be swung towards said vertically movable support.

3. A combined desk and file comprising a pair of oppositely movable, synchronously shiftable, normally closed filing units, a normally lowered vertically movable support for a typewriter or computing machine, a slidable support for each of said units, a carrier for each slidable support, link and lever mechanisms connected with said units, supports and carriers adapted when operated in one direction to provide for the simultaneously shifting of said units to open position and said vertically movable support to its uppermost position and when operating in the opposite direction to lower said vertically movable support and to shift said units to closed position and in sidewise abutting relation and further superposed with respect to the lowered support, means whereby each of said units, when in open position, can be swung towards said vertically movable support, and means for locking the desk when the unit is swung towards said vertically movable support.

4. A combined desk and file comprising a vertically movable support for carrying a typewriter or computing machine, normally closed filing units arranged over said support, means for synchronously opening said units and elevating said support and for positioning the units laterally with respect to the support, and means for swinging each unit, when in a lateral position with respect to the support, in a horizontal angular position towards the latter.

5. A combined desk and file comprising a vertically movable support for carrying a typewriter or computing machine, normally closed filing units arranged over said support, means for synchronously opening said units and elevating said support and for positioning the units laterally with respect to the support, means for swinging each unit, when in a lateral position with respect to the support, towards the latter, and means for locking the desk when a unit is swung towards the support.

6. A combined desk and file comprising a vertically movable support for carrying a typewriter or computing machine, normally closed filing units arranged over said support, each of said units including a shiftable closure, means for synchronously opening said units and elevating said support and for positioning the units laterally with respect to the supports, and means whereby the shiftable closure for each unit when the latter is disposed laterally to the support can be swung upon the top of the unit to provide an arm rest or support.

7. A combined desk and file comprising a vertically movable support for carrying a typewriter or computing machine, normally closed filing units arranged over said support, each of said units including a shiftable closure, means for synchronously opening said units and elevating said support and for positioning the units laterally with respect to the supports, means whereby the shiftable closure for each unit when the latter is disposed laterally to the support can be swung upon the top of the unit to provide an arm rest or support, and a stabilizing device carried by the inner end of said vertically movable support, connected therewith and with said means.

8. A combined desk and file comprising a pair of oppositely movable, synchronously shiftable, normally closed filing units, a normally lowered vertically movable support for a typewriter or computing machine, a slidable support for each of said units, a carrier for each slidable support, link and lever mechanisms connected with said units, supports and carriers and adapted when operated in one direction, to provide for the simultaneously shifting of said units to open position and when operating in the opposite direction to lower said vertically movable support and to shift said units to closed position and in sidewise abutting relation and further superposed with respect to the lowered support, and a stabilizing device connected to said vertically movable support, arranged at one end thereof, and further connected with said link and lever mechanisms.

9. A combined desk and file comprising a pair of oppositely movable, synchronously shiftable, normally closed filing units, a normally lowered vertically movable support for a typewriter or computing machine, a slidable support for each of said units, a carrier for each slidable support, link and lever mechanisms connected with said units, supports and carriers and adapted when operated in one direction to provide for the simultaneously shifting of said units to open position and said vertically movable support to its uppermost position and when operating in the opposite direction to lower said vertically movable support and to shift said units to closed position and in sidewise abutting relation and further superposed with respect to the lowered support, means whereby each of said units, when in open position, can be swung towards said vertically movable support, and a stabilizing device connected with said vertically movable support, arranged at the inner end thereof, and further connected with said link and lever mechanisms and operating synchronously during the vertical movement of said support.

10. A combined desk and file comprising two pair of normally closed filing units, the units of each pair being shiftable in opposite directions with respect to each other, an actuating shaft common to a unit of each of said pairs, a vertically movable support for a typewriter or computing machine common to a pair of units, and link and lever mechanisms connected with said shafts, units and with said supports and providing means for synchronously opening said units and elevating said supports and further for positioning each pair of units laterally with respect to its associated support, and a stabilizing mechanism arranged at the inner end of and connected to each support, and further connected with said link and lever mechanisms to provide for the synchronous operation of the stabilizing mechanisms on the vertical movement of the supports.

11. A combined desk and file comprising two pair of normally closed filing units, the units of each pair being shiftable in opposite directions with respect to each other, an actuating shaft common to a unit of each of said pairs, a vertically movable support for a typewriter or computing machine common to a pair of units, and link and lever mechanisms connected with said shafts, units and with said supports and providing means for synchronously opening said units and elevating said supports and further for positioning each pair of units laterally with respect to its associated support, a stabilizing mechanism arranged at the inner end of and connected to each support and further connected with said link and lever mechanisms to provide for the synchronous operation of the stabilizing mechanisms on the vertical movement of the supports, and means to provide for the swinging of a filing unit, when in lateral position, towards its respective support.

12. A combined desk and file comprising a pair of oppositely movable, synchronously shiftable, normally closed filing units, a normally lowered vertically movable support for a typewriter or computing machine, a slidable support for each of said units, a carrier for each support, and link and lever mechanisms connected with said units, supports and carriers and adapted when operated in one direction to provide for the simultaneously shifting of said units to open position and said vertically movable support to its uppermost position and when operating in the opposite direction to lower said vertically movable support and to shift said units to closed position and in sidewise abutting relation and further superposed with respect to the lowered support, and an operating mechanism connected to said vertically movable support to provide for the actuation of said link and lever mechanisms.

13. A combined desk and file comprising a vertically movable support for carrying a typewriter or computing machine, normally closed filing units arranged over said support, link and lever mechanisms connected with said units and support and adapted when actuated in one direction to synchronously open said units and elevate said support and further position the units laterally with respect to the support and when actuated in the other direction to lower said support and synchronously close said units and further position said units in superposed relation with respect to the support, and manually operated means independent of the units and connected to and operating said link and lever mechanisms in both directions.

14. A combined desk and file comprising a vertically movable support for carrying a typewriter or computing machine, normally closed filing units arranged over said support, link and lever mechanisms connected with said units and supports and adapted when actuated in one direction to synchronously open said units and elevate said support and further position the units laterally with respect to the support and when actuated in the other direction to lower said support and synchronously close said units and further position said units in superposed relation with respect to the support, means for operating said link and lever mechanism in both directions, and means to provide for the locking of said last mentioned means when the units are in open position and the support in an elevated position to prevent the lowering of the support and the closing of the units.

15. A combined desk and file comprising a vertically movable support for carrying a typewriter or computing machine, normally closed filing units arranged over said support, link and lever mechanisms connected with said units and support and adapted when actuated in one direction to synchronously open said units and elevate said support and further position the units laterally with respect to the support and when actuated in the other direction to lower said support and synchronously close said units and further position said units in superposed relation with respect to the support, means for operating said link and lever mechanism in both directions, means to provide for the locking of said last mentioned means when the units are in open position and the support in an elevated position to prevent the lowering of the support and the closing of the units, and means to permit of swinging a filing unit towards a support, when said filing unit is laterally disposed and further for locking said unit when swung towards the support.

16. A combined desk and file comprising a vertically movable support carrying a platform for a typewriter or computing machine, normally closed filing units arranged over said support, link and lever mechanisms connected with said units and support and adapted when actuated in one direction to synchronously open said units and elevate said support and further position the units laterally with respect to the support and when actuated in the other direction to lower said support and synchronously close said units and further position said units in superposed relation with respect to the support, means for operating said link and lever mechanisms in both directions, and means independent of the vertically movable support for vertically moving the platform supporting the typewriter or computing machine above such support to position the typewriter or computing machine for repair purposes.

In testimony whereof, I hereby affix my signature hereto.

JOHN A. HUGHES.